(12) United States Patent
Chandrasekaran et al.

(10) Patent No.: US 9,990,348 B2
(45) Date of Patent: Jun. 5, 2018

(54) SYSTEM AND METHOD FOR MANAGING DATA USING A SPREADSHEET MODEL

(71) Applicants: Prasath Nayanar Chandrasekaran, San Carlos, CA (US); Ranjit Valasa, Fremont, CA (US)

(72) Inventors: Prasath Nayanar Chandrasekaran, San Carlos, CA (US); Ranjit Valasa, Fremont, CA (US)

(*) Notice: Subject to any disclaimer, the term of this patent is extended or adjusted under 35 U.S.C. 154(b) by 321 days.

(21) Appl. No.: 14/704,772

(22) Filed: May 5, 2015

(65) Prior Publication Data

US 2015/0317297 A1    Nov. 5, 2015

Related U.S. Application Data

(60) Provisional application No. 61/988,797, filed on May 5, 2014.

(51) Int. Cl.
| | |
|---|---|
| *G06F 17/24* | (2006.01) |
| *G06F 17/30* | (2006.01) |
| *G06F 9/30* | (2018.01) |
| *H04L 29/08* | (2006.01) |
| *G06F 17/22* | (2006.01) |

(52) U.S. Cl.
CPC ......... *G06F 17/246* (2013.01); *G06F 9/3017* (2013.01); *G06F 17/2288* (2013.01); *G06F 17/30312* (2013.01); *G06F 17/30424* (2013.01); *G06F 17/30917* (2013.01); *G06F 17/30958* (2013.01); *H04L 67/1085* (2013.01)

(58) Field of Classification Search
CPC ............ G06F 17/246; G06F 17/30917; G06F 9/3017; H04L 67/1085
See application file for complete search history.

(56) References Cited

U.S. PATENT DOCUMENTS

| | | | |
|---|---|---|---|
| 6,766,512 B1* | 7/2004 | Khosrowshahi | G06F 8/35 715/234 |
| 7,523,395 B1* | 4/2009 | Namait | G06F 17/246 715/212 |
| 2006/0095833 A1* | 5/2006 | Orchard | G06F 17/246 715/209 |
| 2006/0101391 A1* | 5/2006 | Ulke | G06F 8/00 717/107 |
| 2007/0061698 A1* | 3/2007 | Megiddo | G06F 17/2247 715/210 |
| 2016/0055140 A1* | 2/2016 | McKenzie | G06F 17/246 715/212 |

* cited by examiner

*Primary Examiner* — Asher D Kells
(74) *Attorney, Agent, or Firm* — Innovation Counsel LLP

(57) ABSTRACT

An exemplary embodiment of the present system and method provides a non-transitory, tangible computer readable storage medium having stored thereon computer-executable instructions. When executed by a computer, the instructions cause the computer to perform a number of steps, of which include: receiving a spreadsheet model; analyzing the spreadsheet model to determine one or more properties of the spreadsheet model; providing a first user interface on the basis of the determined properties, the first user interface enables configuration information to be specified for one or more cells of the spreadsheet model; receiving configuration information for the cells; and storing the spreadsheet model and the configuration information.

18 Claims, 26 Drawing Sheets

SYSTEM AND METHOD FOR MANAGING DATA USING A SPREADSHEET MODEL

CROSS-REFERENCE TO RELATED APPLICATIONS

This application claims priority to and the benefit of U.S. Provisional Patent Application Nos. 61/988,797 entitled "TARGETED PLATFORM FEATURES"), filed on May 5, 2014, the entire contents of which are incorporated herein by reference in their entirety.

RELATED FIELD

The present disclosure relates in general to data management, and in particular, to a system and method for managing data and data models.

BACKGROUND

Every day more and more data are being aggregated by companies with the hope that useful information can be extracted from the data. The data may be collected directly by the companies themselves or by third-party vendors who sell the data to the companies. For example, a company may be interested in evaluating its sales performance of a particular brand relative to its competitors in various market regions. To start, the company may collect data on its own sales of the particular brand for the various regions and buy data of the same regarding its competitors' sales from a third party. Having gathered the data, the company may enter the data into one or more models to try to extract information from the data. The details of the process, however, are usually not straightforward, and companies are usually faced with a number of problems.

A first problem that companies usually face is having to manage a significant number of different models and their revisions over time. For example, a company generally has numerous spreadsheet analysis models that enable it to evaluate different aspects of its business using mathematical functions and other capabilities supported by the spreadsheet. These models, however, are hard to institutionalize due to lack of version control. Also, integrating the spreadsheet models into software programs already in use by the company would require extensive investments in both time and money. As a result, companies are generally unable to integrate decision-support models into existing software without spending thousands, if not millions, of dollars in developing cumbersome programs.

A second problem that companies usually face is working with many different data sources and/or data formats. When incoming data are not standardized in any one uniform structure, companies are often unable to load and integrate data from disparate sources. As a result, companies may spend thousands of dollars attempting to modify their underlying data model, change SQL/ETL and other tools used for data processing, and troubleshoot issues with data quality. In some cases, a company may try to modify and standardize the structure of the incoming data sources. However, such an endeavor is hard to achieve because the data providers are often third parties who do not have the same incentives as the company.

In view of the foregoing, there exists a need for a system and method for managing data and data models that overcome these problems.

SUMMARY

An exemplary embodiment of the present system and method provides a non-transitory, tangible computer readable storage medium having stored thereon computer-executable instructions. When executed by a computer, the instructions cause the computer to perform a number of steps of, which include: receiving a spreadsheet model; analyzing the spreadsheet model to determine one or more properties of the spreadsheet model; providing a first user interface on the basis of the determined properties, the first user interface enables configuration information to be specified for one or more cells of the spreadsheet model; receiving configuration information for the cells; and storing the spreadsheet model and the configuration information.

Another exemplary embodiment of the present system and method provides a non-transitory, tangible computer readable storage medium having stored thereon computer-executable instructions. When executed by a computer, the instructions cause the computer to perform a number of steps of, which include: receiving a user request to upload a data file; obtaining metadata associated with the data file; receiving the data file; determining a master data model on the basis of the data file and the metadata; providing a first user interface on the basis of the master data model, the first user interface enables mapping information to be specified between one or more fields in the data file and one or more fields in the master data model; receiving mapping information between the fields in the data file and the fields in the data model; and saving the mapping information as a data translation map.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

FIGS. 18, 20, 21, 22, 23, 24, and 25 illustrate exemplary user interfaces with which a user may interact with the data management system, according to an embodiment of the present system and method;

Figure 1:
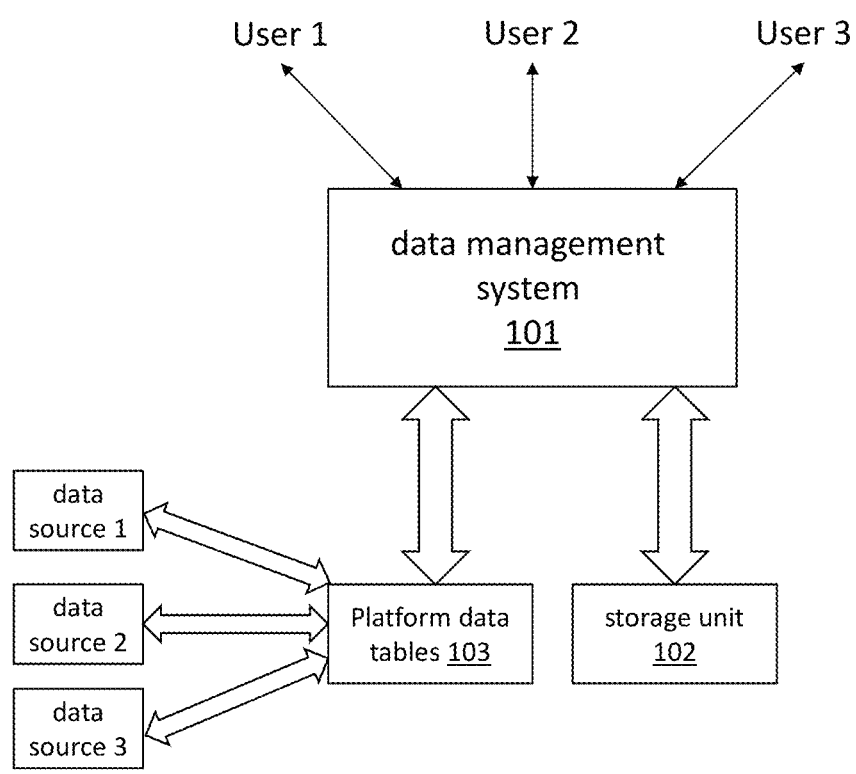
FIG. 1 illustrates an exemplary data management system, according an embodiment of the present system and method.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide a system and method for direction-based communication. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

The present disclosure describes a system and method for managing data and data models that include many different aspects. For example, a first aspect of the present system and method enables users to utilize the functionality and behavior of their complex, spreadsheet models and analysis tools without having to convert or integrate these spreadsheet models into new or existing software programs. A second aspect of the present system and method enables users to source data from multiple data sources and integrate the data into a unified data model regardless of the file structure or data dictionary of the incoming data source.

Figure 2:
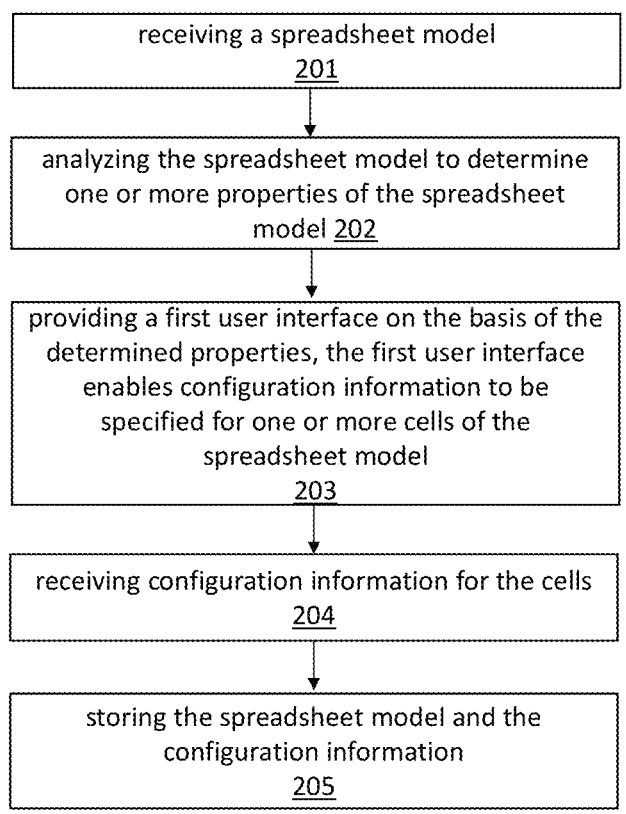
FIG. 2 is a flow chart summarizing the exemplary processes performed by the data management system when a user uploads and configures a new spreadsheet model, according to an embodiment of the present system and method.
Figure 3:
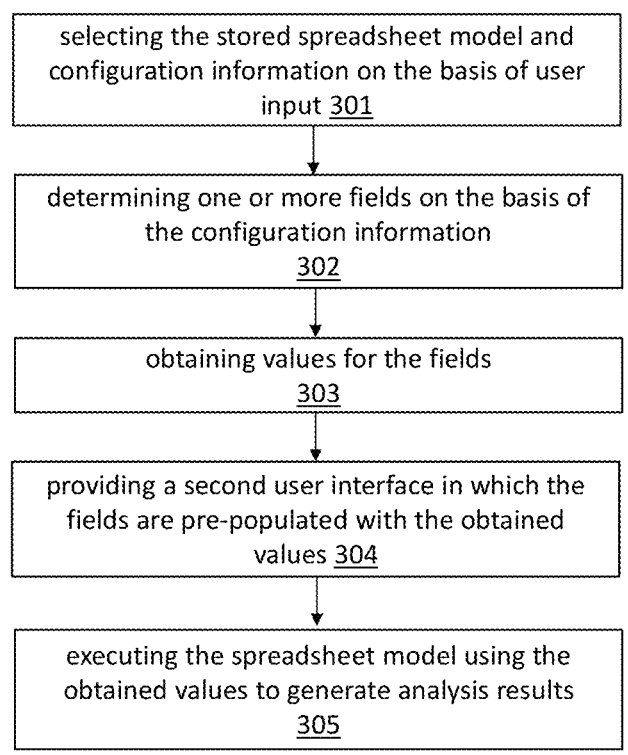
FIG. 3 is a flow chart summarizing the exemplary processes performed by the data management system when a user accesses the data management system to utilize the functions of a stored spreadsheet model to perform an analysis, according to an embodiment of the present system and method.

The aforementioned aspect of the present system and method that enables users to utilize the functionality and behavior of their complex, spreadsheet models and analysis tools is described below with reference to FIGS. 1 to 16, according to an exemplary embodiment. FIG. 1 illustrates an exemplary data management system, according an embodiment of the present system and method. FIGS. 2 and 3 are flow charts summarizing the exemplary processes performed by the data management system, according to an embodiment of the present system and method. FIGS. 4 to 16 illustrate exemplary user interfaces and data management system processes, according to an embodiment of the present system and method.

FIG. 1 shows a data management system 101 that allows users (e.g., User 1, User 2, and User 3) to store and share their spreadsheet models in an efficient and organized manner. Particularly, the data management system 101 enables users to upload a spreadsheet model and provide configuration information for the spreadsheet model. Once the spreadsheet model is uploaded and configured, the data management system 101 stores the spreadsheet model and the associated configuration information along with a version number. The stored spreadsheet model then becomes available for use by other users who wish to perform their own analysis using the stored spreadsheet model.

FIG. 2 is a flow chart summarizing the exemplary processes performed by the data management system 101 when User 1 uploads and configures a new spreadsheet model, according to an embodiment of the present system and method. The data management system receives a spreadsheet model (201). The data management system analyzes the spreadsheet model to determine one or more properties of the spreadsheet model (202). The data management system provides a first user interface on the basis of the determined properties (203). The first user interface enables configuration information to be specified for one or more cells of the spreadsheet model. The data management system receives configuration information for the cells (204). The data management system stores the spreadsheet model and the configuration information (205).

FIG. 3 is a flow chart summarizing the exemplary processes performed by the data management system 101 when User 2 accesses the data management system 101 to utilize the functions of a stored spreadsheet model to perform an analysis, according to an embodiment of the present system and method. The data management system selects a stored spreadsheet model and the associated configuration information on the basis of user input (301). The data management system determines one or more fields on the basis of the associated configuration information (302). The data management system obtains values for the fields (303). The data management system provides a second user interface in which the fields are pre-populated with the obtained values (304). The data management system executes the spreadsheet model using the obtained values to generate analysis results (305).

Figure 4:
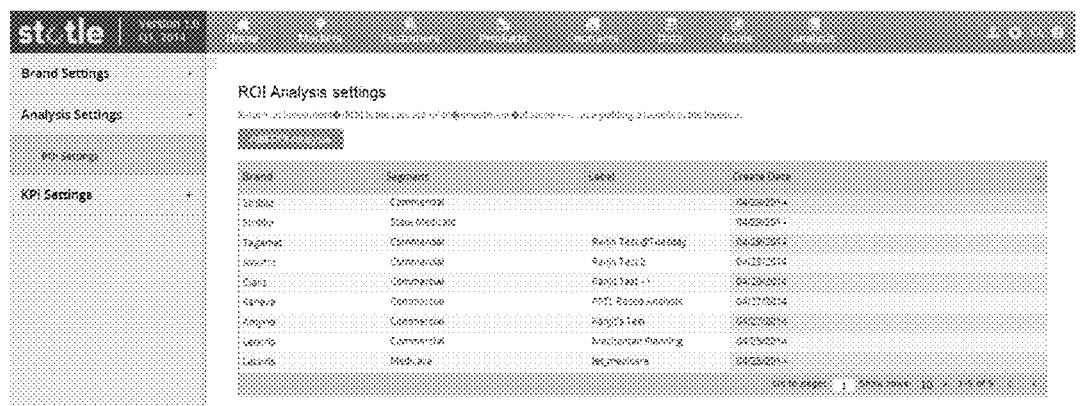
FIGS. 4, 5, 7, 8, 9, 11, 13, 14, 15, and 16 illustrate exemplary user interfaces with which a user may interact with the data management system, according to an embodiment of the present system and method.

As an example, consider the case in which User 1, a company employee, has a return-on-investment (ROI) spreadsheet model for analyzing a product A and wishes to upload the spreadsheet model to the data management system 101 so that other users (e.g., User 2 and User 3) can also use the model. FIG. 4 illustrates an exemplary user interface for uploading and configuring a new spreadsheet model.

Figure 5:
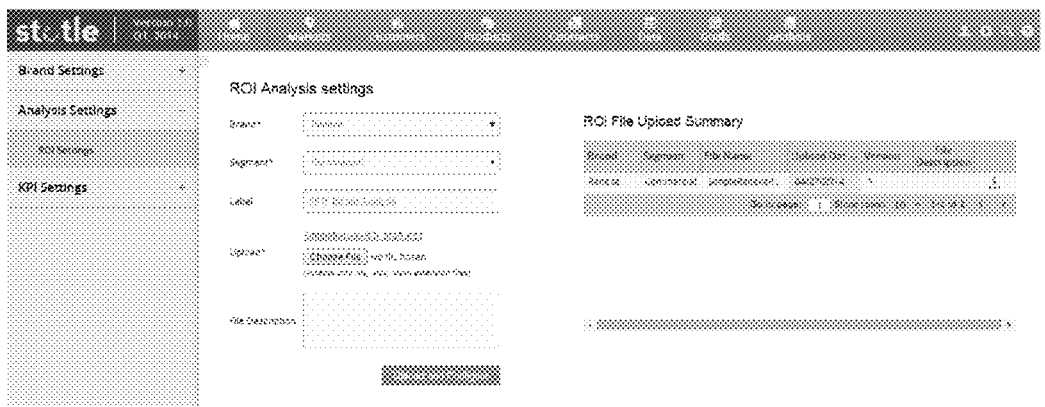

Before uploading the spreadsheet model, User 1 may input information into the data management system 101 to specify the product or product brand to which the spreadsheet model relates to and/or the customer segment to which the spreadsheet model applies. As described later, this information, which may be saved as part of the configuration information for the spreadsheet model, allows other users to quickly identify the spreadsheet model that is applicable to the product they want to analyze. FIG. 5 illustrates an exemplary user interface that enables User 1 to specify the product brand, customer segment, and spreadsheet model (e.g., a file having .xls, .xlsx, .xlsn file extensions) for upload.

Figure 6:
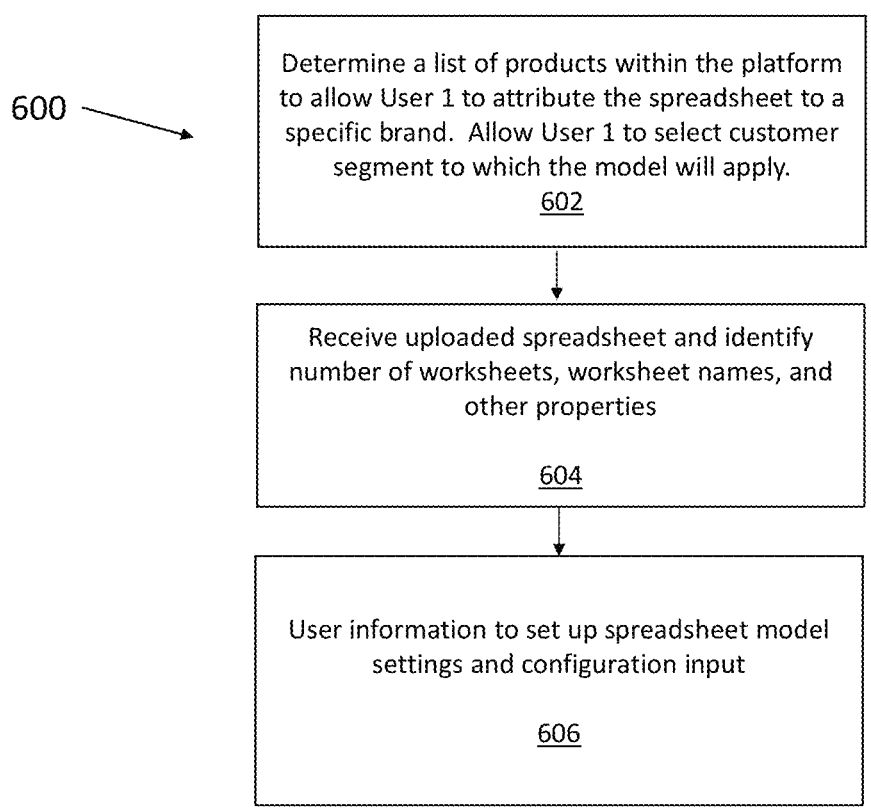
FIG. 6 depicts a flowchart of spreadsheet model loading process in accordance with an embodiment of the present system and method.

FIG. 6 depicts a flowchart of spreadsheet model loading process 600, at least part of which may involve receiving input via the user interfaces of FIGS. 4 and 5. Prior to uploading the spreadsheet, a list of products for the platform is determined. For example, in case User 1 is in the pharmaceutical industry, determining a list of products within the platform allows users to attribute the spreadsheet to a specific brand (602). Users are also allowed to select a customer segment to which the model applies (e.g., "Commercial," as depicted in FIG. 5). After User 1 uploads the spreadsheet model to the data management system 101, the data management system 101 analyzes the spreadsheet model to determine the number of worksheets, the names of the worksheets, as well as other properties (604). The data management system 101 then uses these determined properties to set up the spreadsheet model settings and generate configuration interface picklists for inputting configuration information (606). A picklist is a list of values from which the user may select for a field.

Figure 7:
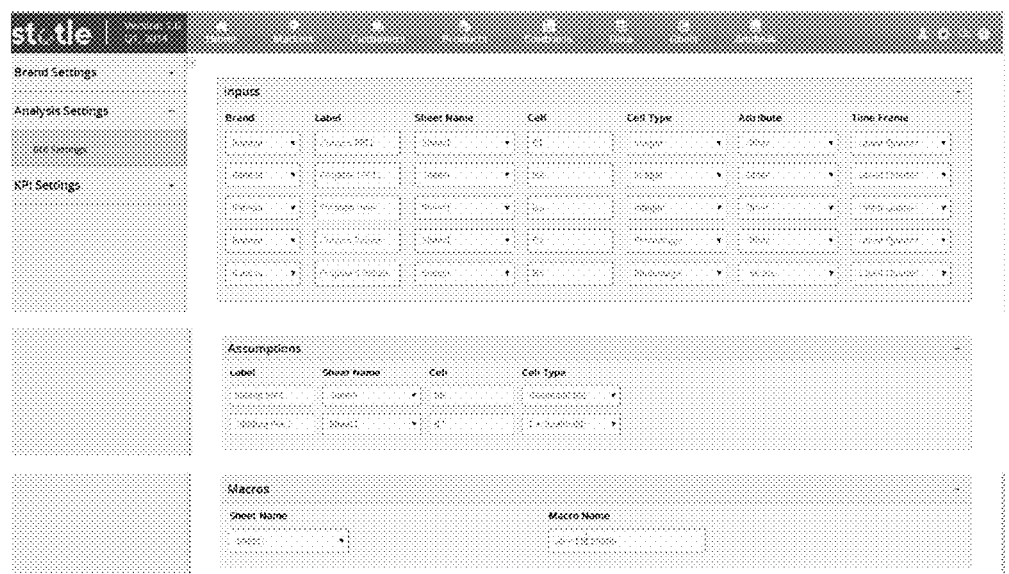
Figure 8:
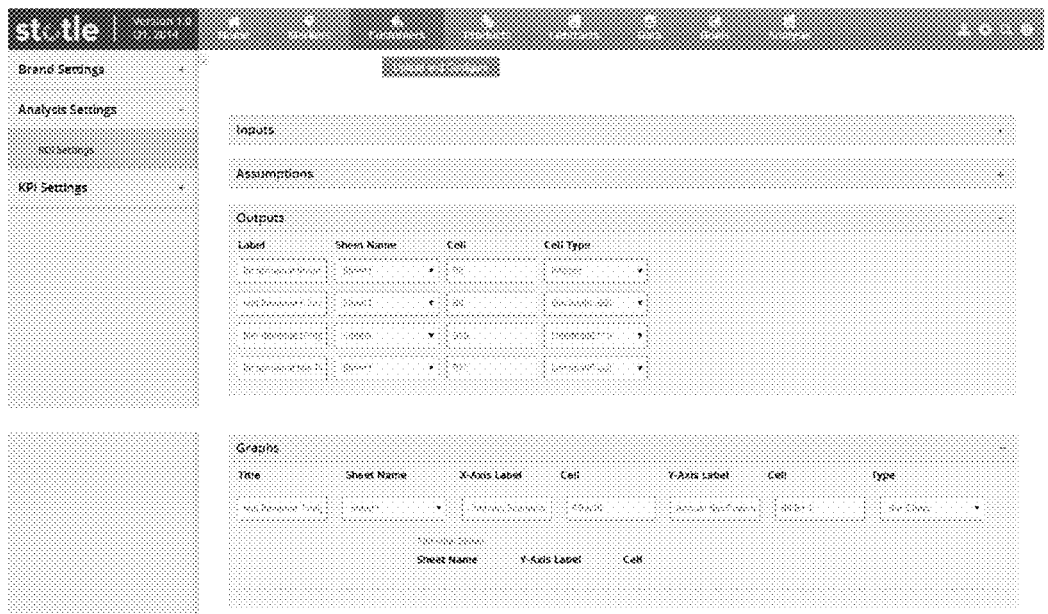

FIGS. 7 and 8 illustrate exemplary configuration interfaces that enable User 1 to specify configuration for one or more cells in the spreadsheet model. The user interface includes an "Inputs" section, an "Assumptions" section, a "Macros" section, an "Outputs" section, and a "Graphs" section that are to be completed by the user.

In the "Inputs" section, User 1 is able to specify which cells in the spreadsheet model are input cells, such as by selecting the sheet name, cell number, and cell type from pick lists. User 1 is also able to specify other information for the input cells, including a label, the type of attribute, and the data timeframe to be used. Similarly, in the "Assumptions" section, User 1 is able to specify which cells in the spreadsheet model are assumptions (e.g., dosage size, interest rate, tax rate, etc.) by selecting the sheet name, cell number, and cell type from pick lists. In the "Macros" section, User 1 is able to specify one or more macros contained in the spreadsheet model that are to be executed as part of the spreadsheet model and the order of execution of the macros. In the "Outputs" section, User 1 is able to specify which cells in the spreadsheet model are output cells by selecting the sheet name, cell number, and cell type from pick lists, and a label for each of the output cells. That is, the locations of the cells of the spreadsheet model from which the output values are to be derived are stored along with user-specified labels. In the "Graphs" section, User 1 is able to specify the settings for generating one or more graphs, including a title for the graph, the type of graph to generate, labels for the graph axes, and which cells in the spreadsheet model are the data cells to be plotted on the graph. User 1 may specify data cells in the spreadsheet model by indicating the sheet name and ranges of cell numbers (e.g., A9:A10 for data along the X-Axis and B9:B10 for data along the Y-Axis).

After the configuration information for configuring the spreadsheet model is received, the data management system 101 stores the spreadsheet model and an associated configuration file containing the configuration information in a storage unit 102. The data management system 101 may implement version control and thus assign a version number to the stored spreadsheet model. The data management system 101 may store the spreadsheet model in the same condition and/or file format in which it was uploaded without performing any conversions. Once stored, the spreadsheet model becomes available to users who want to use the spreadsheet model for their own analysis.

For example, if User 2 wants to perform an ROI analysis on product A but does not have the knowledge or expertise to create his own model, User 2 may access the data management system 101 to utilize the functions of the spreadsheet model uploaded by User 1 to perform the ROI analysis. To help User 2 identify a suitable spreadsheet model for the analysis, the data management system 101 may prompt User 2 for certain information.

FIGS. 7 and 8 illustrate exemplary user interfaces for specifying information used by the data management system 101 to determine the appropriate spreadsheet model and associated configuration file for the type of analysis desired (in this case, an ROI analysis). Referring to FIG. 7, in the section titled "Inputs," User 1 may specify worksheet name, cell location, cell type, the type of attribute, and the timeframe to be used. In the section titled "Assumptions," User 1 specifies label, worksheet, cell type, and cell location. Any macros to be executed as part of the model may be specified in the section titled "Macros." Sheet names and macro names, for example, may be specified. Referring to FIG. 8, User 1 may configure Outputs by specifying label, worksheet, cell type, and cell location in the section titled "Outputs." If any graph is desired, User 1 may provide details for the graphs (e.g., type of graph, data source, x-axis, y-axis, etc.) in the section titled "Graphs."

User 2 may specify the analysis type, product brand, customer segment, and other additional information, such as a particular contract or a specific customer. If no customer is specified, a default or new customer entity may be created and associated with the analysis to be performed. On the basis of the information specified by User 2, the data management system 101 scans through an analysis database to determine the spreadsheet model to be used. If multiple versions of the spreadsheet model exist, the data management system 101 may prompt User 2 to select a version or automatically select the latest version for performing the analysis.

Figure 9:
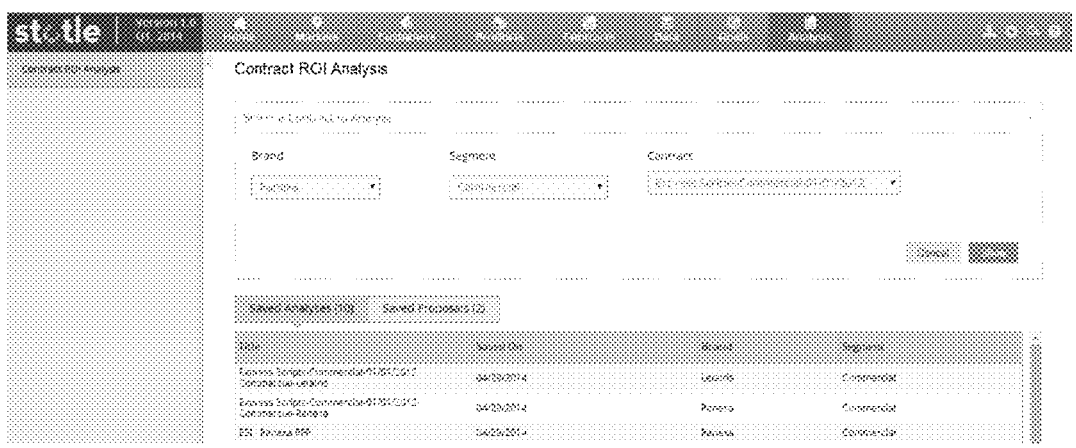

After the spreadsheet model and version thereof have been determined, the data management system 101 provides User 2 with an analysis interface including the input and assumption fields indicated in the associated configuration file. FIG. 9 is an exemplary embodiment of a user interface that may be used to receive information for identifying the model and configuration setting. The analysis type may be selected on the lefthand side (e.g., "Contract ROI Analysis"). The brand, customer segment, and additional information may be provided for the analysis to be done.

Figure 10:
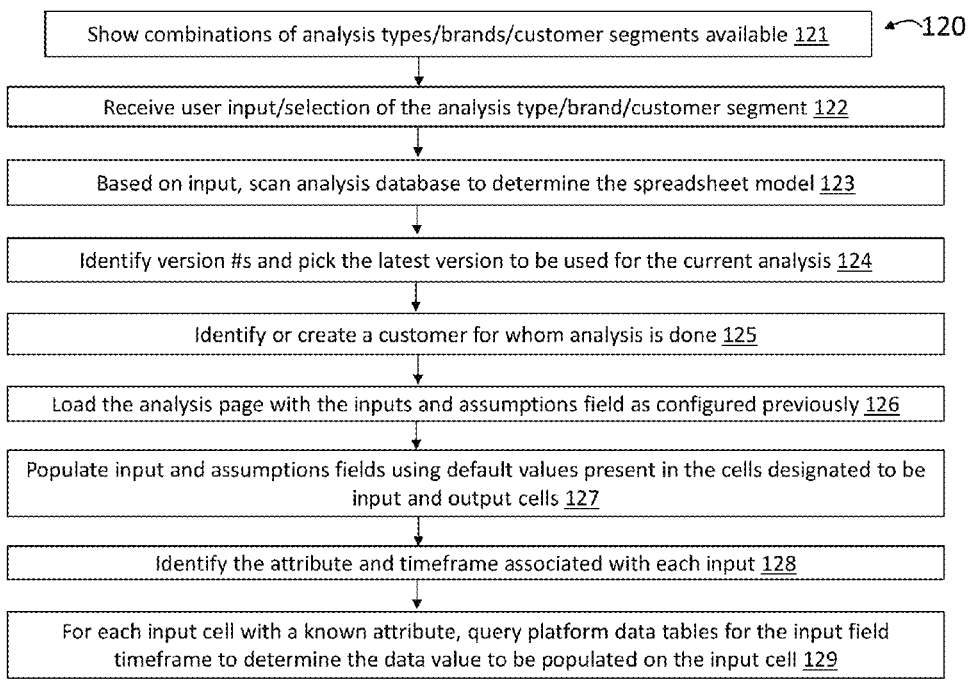
FIG. 10 depicts a flowchart for a model and configuration setting identifying process in accordance with an embodiment of the present system and method.

FIG. 10 depicts a flowchart for a model and configuration setting identifying process 120 that may be executed at least in part by using the user interface of FIG. 9. As depicted, the model and configuration setting identifying process 120 begins by the data management system 101 displaying the combinations of analysis types/brands/customer segments available to a user, e.g. User 1 (121). A user makes a selection among the choices that are shown, and this input is received (122). Based on this input, the data management system 101 scans through the analysis database to determine the spreadsheet model to be used (123). The data management system 101 then picks the latest version to be used for the analysis (124), and identifies or creates the customer for which the analysis is to be done (125). The analysis page is loaded with the inputs and assumptions fields as configured previously, e.g. using the interfaces shown in FIG. 8 (126). The input and assumption fields are populated using default values present in the cells designated to be input and output cells (127). The attribute and timeframe that is associated with each input is then identified (128). For each input cell with a known attribute, platform data tables for the input field timeframe is queried to determine the data value to be populated on the input cell (129).

Figure 11:
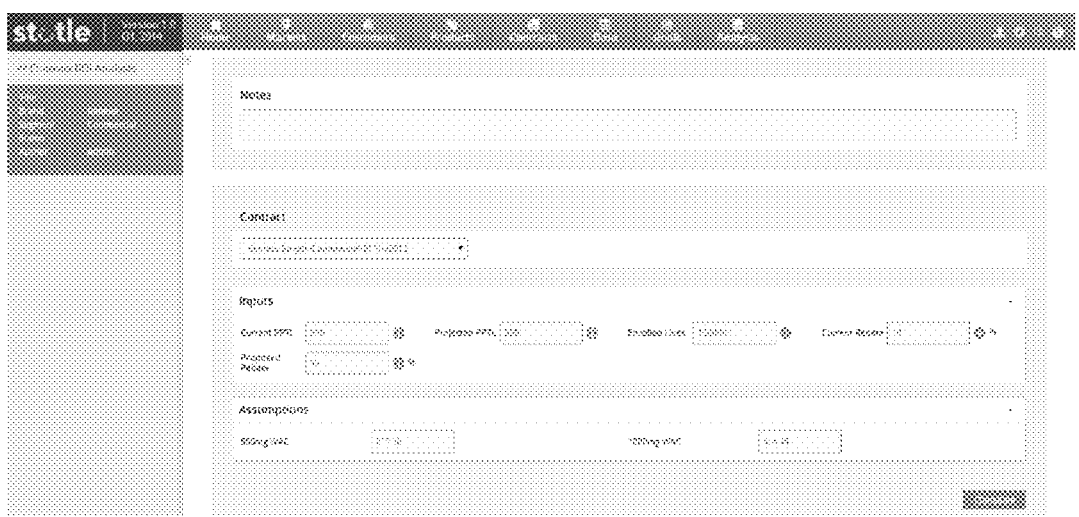

FIG. 11 illustrates an exemplary analysis interface in which the input and assumption fields are pre-populated with default values. The default values, however, may be overridden by User 2 entering new values in the fields. The input fields may be pre-populated with values queried from one or more platform data tables 103 if the customer is known. Particularly, if the customer is known, the data management system 101 may identify the attribute and timeframe associated with each input cell on the basis of the configuration information associated with the spreadsheet model, and for each input cell with a known attribute, query the platform data tables 103 for the input cell timeframe to determine the data value to be populated. The assumption fields may be pre-populated with values in the spreadsheet model.

As shown in FIG. 11, the analysis interface may further include a "Notes" field in which User 2 may enter notes and a "Calculate" button. Activating the "Calculate" button sends a request to the data management system 101 to perform the analysis using the spreadsheet model and the values shown in the input and assumption fields. However, before performing the analysis, the data management system 101 determines what values are in the input and assumption fields, checks if a mandatory field is left incomplete, and if so, sends an error message to prompt User 2 to check the fields. After the values in the input and assumption fields are determined and validated, the data management system 101 executes the spreadsheet model using said values, such as by making a function call to a relevant program, code library, API, or web service, to generate analysis results.

In more detail, according to an embodiment, the data management system 101 may use Apache POI, Microsoft DCOM, XML, other packages or web services to translate the values from the input and assumption fields into inputs that can be processed by the spreadsheet model and populate those values into the spreadsheet model on the basis of the cell labels, cell locations, worksheet locations and other information captured in the configuration file. The data management system 101 determines whether macros need to be executed on the basis of the information in the configuration file. If so, the data management system 101 determines the names of the macros and the order in which they are to be executed and executes the macros accordingly. The data management system 101 also recalculates the formulas in the spreadsheet model. To generate analysis results, the data management system 101 identifies the locations of the output cells in the spreadsheet model on the basis of the configuration information and extracts the recalculated values of those output cells. The data management system also determines the data cells in the spreadsheet that are to be used to construct any graphs specified in the configuration file.

Figure 12:
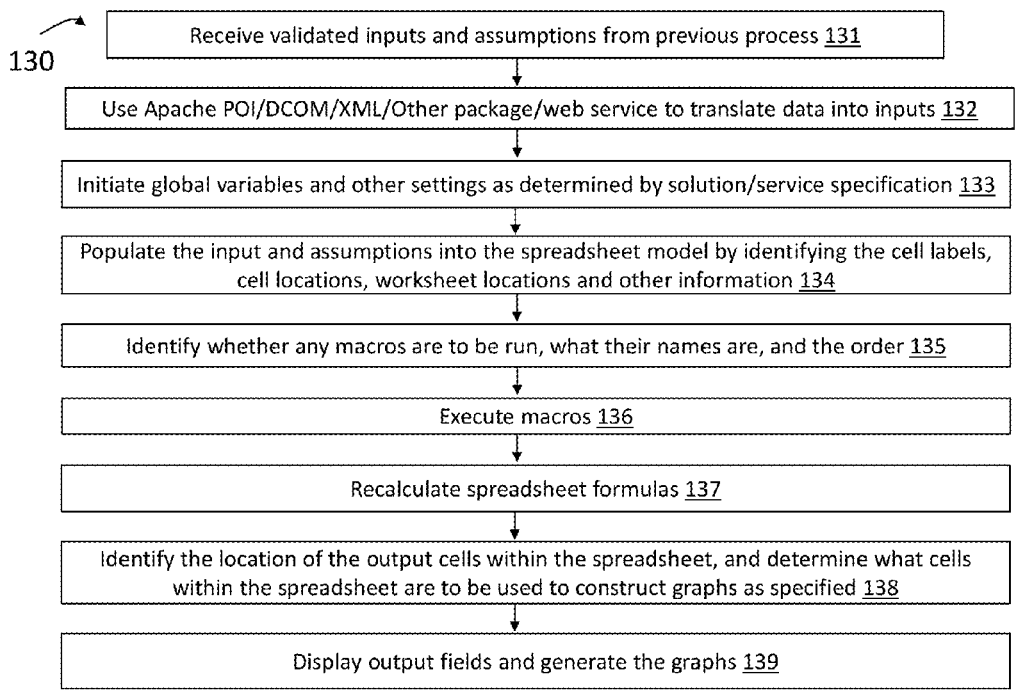
FIG. 12 depicts a flowchart for a spreadsheet model execution process in accordance with an embodiment of the present system and method.

FIG. 12 depicts a flowchart for a spreadsheet model execution process 130 in accordance with the inventive concept. As shown, the spreadsheet model execution process 130 begins with the data management system 101 receiving the validated inputs and assumptions (131). The Apache POI/DCOM/XML/Other package/web service translates data received into inputs that can be processed by the underlying spreadsheet model (132). Global variables and other settings as determined by solution/service specification are initiated (133). Input and assumptions are populated into the spreadsheet model by identifying the cell labels, cell locations, worksheet locations and other information captured in the configuration file for each of the fields (step 134). Any macros that need to be run are identified (step 135) by names, and the order in which they are to be run is determined. The macros are executed (136) and spreadsheet formulas are recalculated (137). The data management system 101 identifies the location of the output cells within the spreadsheet (138) and determines what cells within the spreadsheet are to be used to construct any graphs as specified in the configuration tables. The output fields are displayed on the user interface along with the graphs (139). Function buttons such as "Save," "Print," and "Download" may also be enabled. In response to a user clicking on the "Download" button, a model spreadsheet with the populated inputs, outputs, assumptions, and changes as previously received from the user and generated by the model are exported. In response to a user clicking on the "Print" button, a user may be provided with an option to preview and print the analysis along with its inputs, outputs, graphs, macros, brand/customer information, etc.

Figure 13:
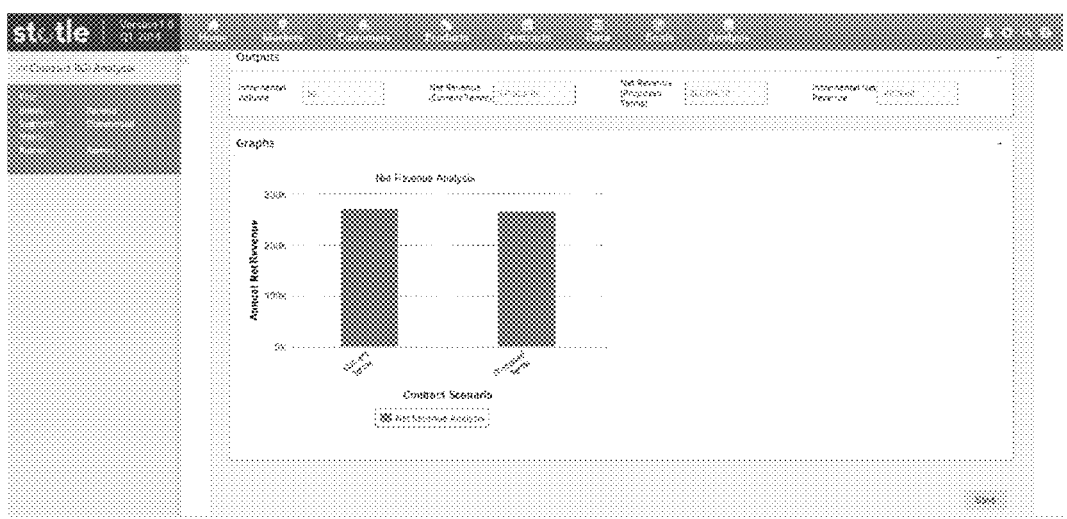

FIG. 13 illustrates an exemplary output interface in which analysis results generated by the spreadsheet model are displayed numerically in an "Outputs" section and graphically in a "Graphs" section. The analysis results are generated on the basis of the configuration information previously provided by User 1 in the configuration file. Particularly, the numerical fields and their labels in the "Outputs" section correspond to the output cells of the spreadsheet model and the labels indicated in the configuration file. Similarly, the title for the graph, the type of graph generated, the labels for the graph axes, and data cells plotted correspond to those indicated in the configuration file.

Figure 14:
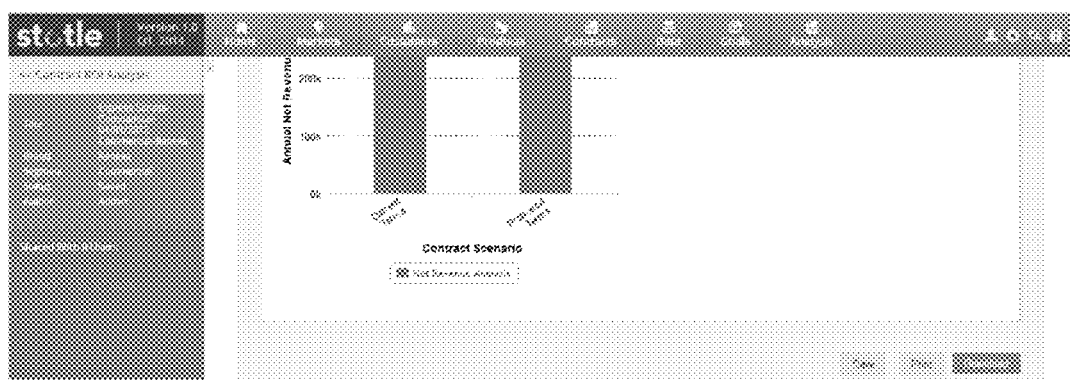
Figure 15:
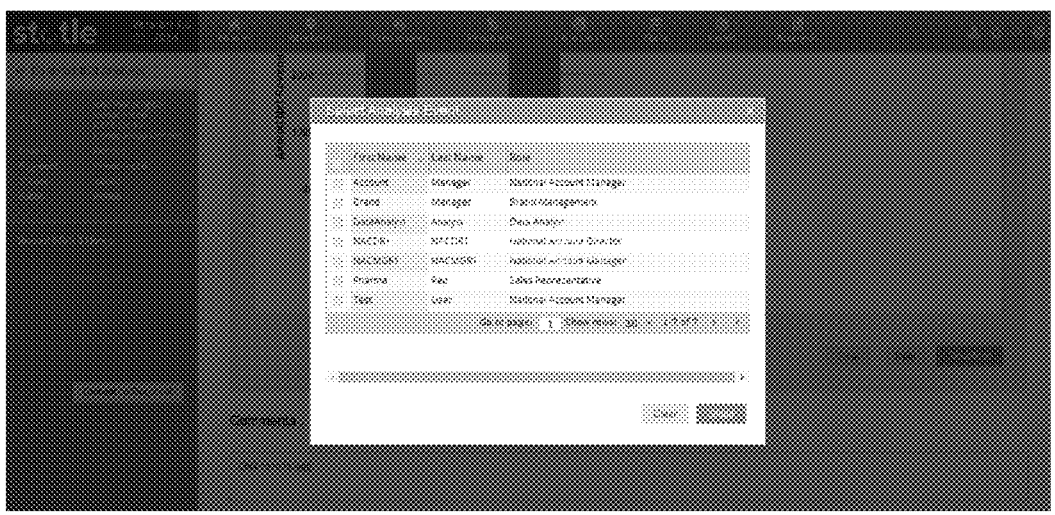
Figure 16:
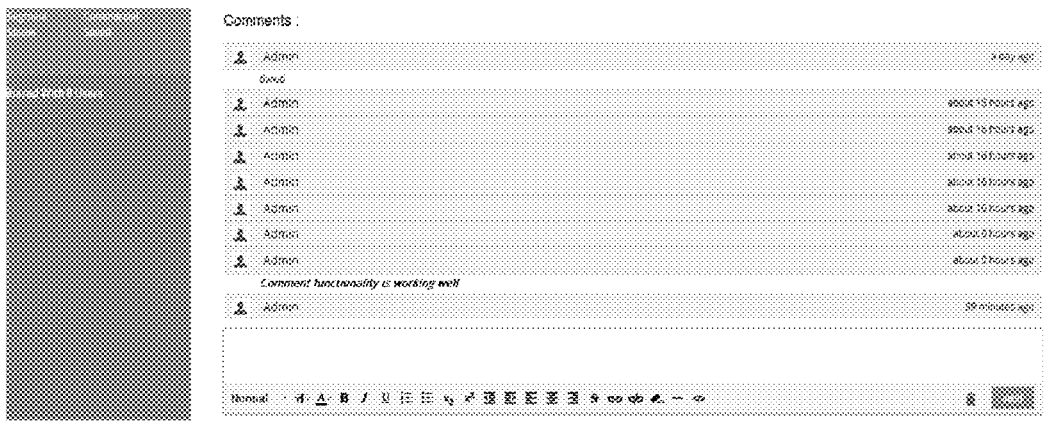

FIG. 14 shows a user interface that may be used by the data management system 101 to enable User 2 to save, download, and print the generated analysis results. The data management system 101 enables User 2 to share the analysis results with other users (e.g., User 1 and User 3), such as by providing a share link, and shows the number of users the analysis results are currently shared with. Clicking on the share link causes the data management system to provide a list of users with whom the analysis results may be shared, such as shown in FIG. 15. The data management system 101 may apply user authorization controls to share the analysis only with users with the appropriate permission levels. The data management system 101 also enables users with whom the analysis results are shared to comment on the analysis results, such as shown in FIG. 16. Therefore, in view of the discussion above, the data management system 101 allows users to store and share their spreadsheet models in an efficient and organized manner.

Referring back to FIG. 1, the platform data tables 103 source their data from data sources 1, 2, and 3, each of which may have different file structures and/or data dictionaries. To upload the data from each of the different data sources 1, 2, and 3 to the platform data tables 103, the data management system creates a data translation map for each of the different sources 1, 2, and 3. Once created and stored, a data translation map may be used for all subsequent uploads from the corresponding data source.

Figure 17:
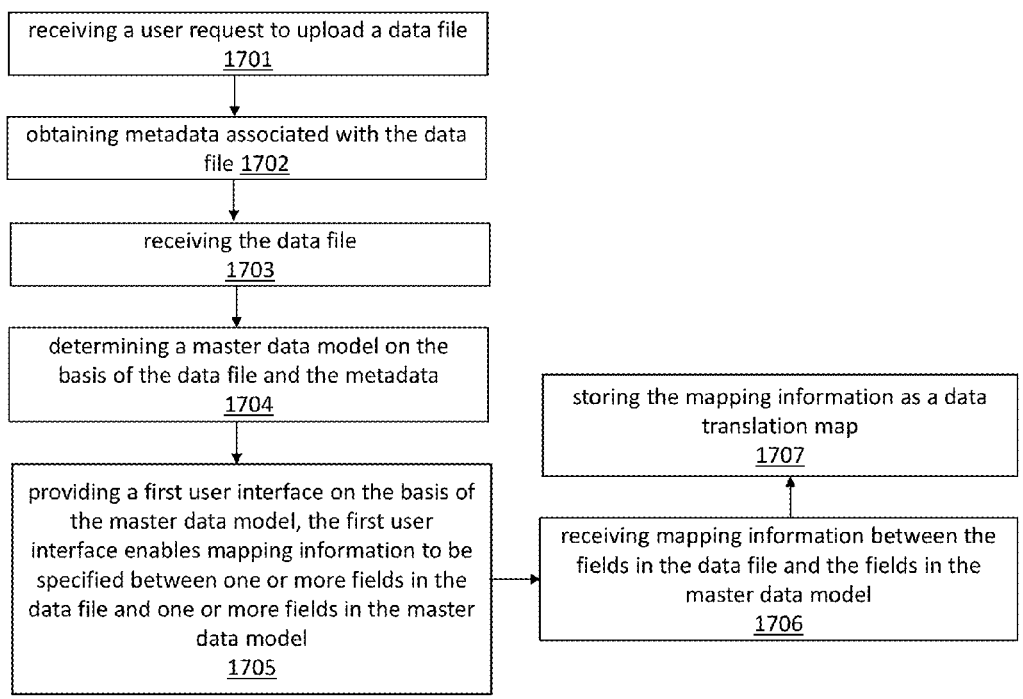
FIG. 17 is a flow chart summarizing the exemplary processes performed by the data management system, according to an embodiment of the present system and method.
Figure 18:
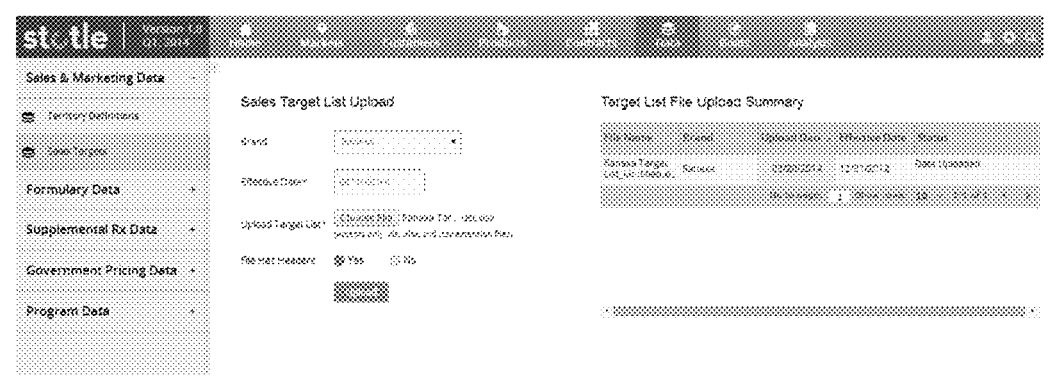
Figure 19:
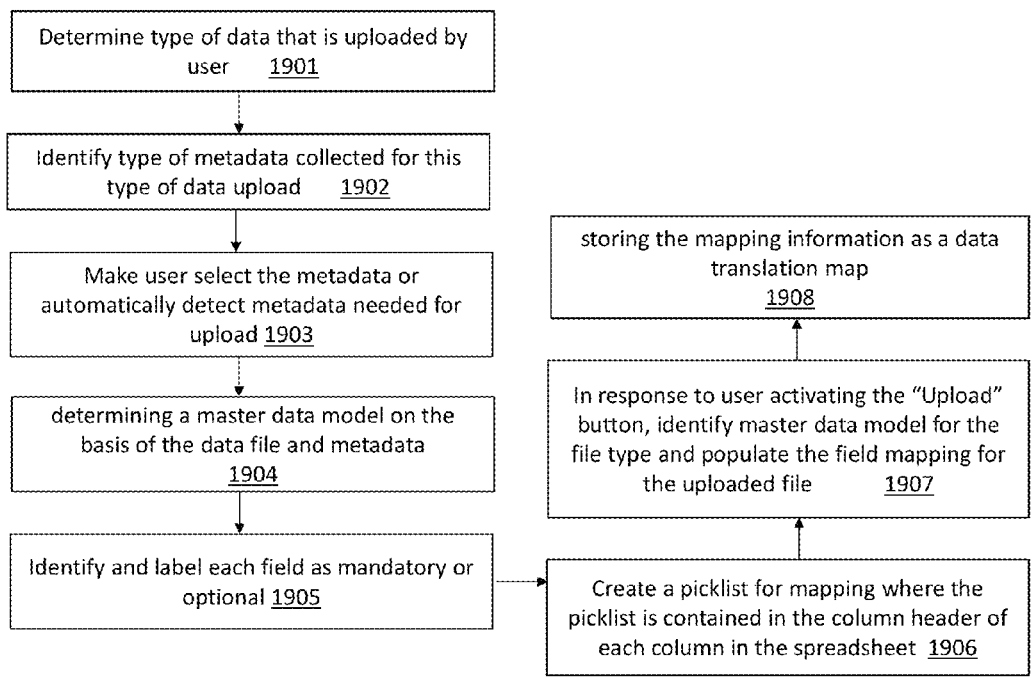
FIG. 19 depicts a flowchart of a master data model identification process in accordance with an embodiment of the present system and method.
Figure 20:
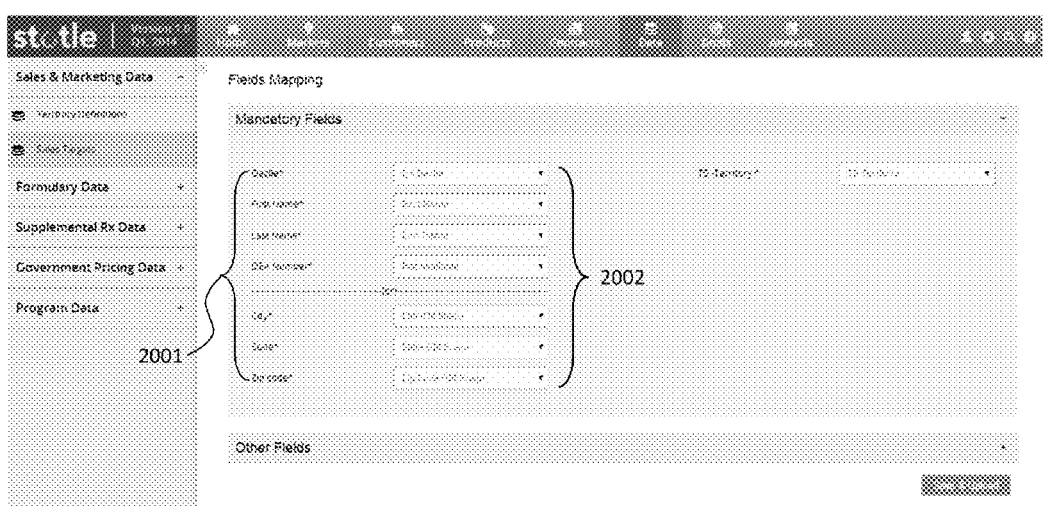
Figure 21:
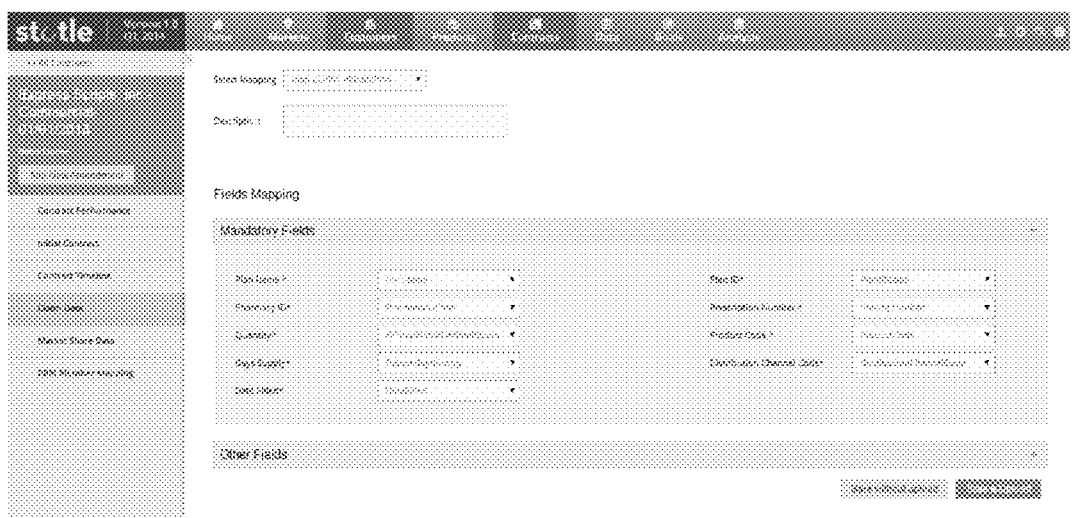

The aforementioned aspect of the present system and method that enables users to source data from multiple data sources and to integrate the data into a unified data model is described below with reference to FIGS. 1 and 17 to 21, according to an exemplary embodiment. FIGS. 17 and 19 are flow charts depicting the exemplary processes performed by the data management system, according to an embodiment of the present system and method. FIGS. 18, 20, and 21 illustrate exemplary user interfaces with which a user may interact with the data management system, according to an embodiment of the present system and method.

FIG. 17 illustrates exemplary processes performed by the data management system 101 to create a data translation map for a corresponding data source. The data management system receives a user request to upload a data file (1701). The data management system may analyze the request to determine the type of data that is to be uploaded. For example, in the case of FIG. 18, the user is requesting the upload of a "Sales Target List."

Then, the data management system obtains metadata associated with the data file (1702), which may include identifying the type of metadata that needs to be collected on the basis of the type of data to be uploaded and prompting the user to input the metadata. For example, in the case of FIG. 18, the data management system prompts the user to input the product brand and effective date. Other metadata may include customer segment, time periods, etc.

The data management system receives the data file (1703) and determines a master data model on the basis of the data file and the metadata (1704). The master data model may also be determined on the basis of the data type. The data management system provides first a user interface on the basis of the master data model (1705). The data management system may use the data layout and data dictionary of the master data model to populate the first user interface. The first user interface enables mapping information to be specified between one or more fields in the data file and one or more fields in the master data model.

FIG. 19 depicts a flowchart of a master data model identification process 1900, which may include use of the user interface shown in FIG. 18. To identify the master data model, the system first determines the type of data that is uploaded by the user (1901). Then, based on that determination, the type of metadata that should be collected is identified (1902). From the user interface, the system either forces the user to select the metadata or automatically detects metadata that is appropriate for upload (1903). Metadata may include brand, effective date, segment, time periods, etc. When user uploads the file, determine the corresponding master data model using the data type and the metadata gathered before (1904). Using the master data model, data layout, and data dictionary, the system populates the user interface and asks the user to map the fields in the uploaded file to the fields on the data model. Each field is labeled as mandatory or optional (1905). A picklist is created for mapping (1906). The picklist may be contained in the header of each column in the spreadsheet/worksheet. In cases where no header record is present, data may be shown in the top row to populate the picklist. When a user clicks on the "Upload" button, the master data model for the file type is identified and the field mapping for the uploaded file is populated (1907).

FIG. 20 illustrates an exemplary first user interface in which the fields 2001 corresponding to those in the master data model can be mapped to fields 2002 corresponding to those in the data file. For each field in the master data model, the upload file column or field assigned by the user as the map is first identified. Then, a data translation map is developed for the file being uploaded by consolidating all such field assignments that collectively make up the data map. The data management system may indicate which fields are mandatory (e.g., with an asterisk) and which fields are optional (e.g., without an asterisk). The fields 2002 may be pick lists of the column header of each column in the data file. If no header record is present, the pick lists may be populated with data in the first row of each column in the data file. By selecting from the pick lists for each of the fields 2002, the columns in the data file may be appropriately mapped to those in the master data model. The mapping information captures the location of each data element in the data layout of the master data model and its corresponding location in the data file to be uploaded.

In the example of FIG. 20, the fields are composed of each data element within the predefined master data model for the type of data being uploaded. After the user has finished mapping each of the fields 2002 and selects the "Save & Upload" button, the data management system receives the mapping information between the fields in the data file and the fields in the master data model (1907) and stores the mapping information as a data translation map (1908). The data translation map may be stored with metadata, such as the date of creation, the customer entity the mapping corresponds to, the brand or product identifiers to which the mapping relates to, the analysis type, the data type, etc., and may be attributed to a file type and customer.

FIG. 21 depicts an example user interface that shows fields for mapping. Mapping captures the location of each data element within the master data layout and its corresponding location on the file that is uploaded. When the map is stored, each map is attributed to the correct file type and customer. The data management system may further complete the data upload by populating one or more platform data tables using data from the data file in accordance with the mapping information. That is, the data management system may use the data translation map to determine which field or column in the data file is equivalent to a defined column or field in the master data model and then use the determined information to copy the data in the data file to the appropriate column or field of the platform data tables.

In the user interface depicted in FIG. 21, the fields corresponding to those in the master data model can be mapped to fields corresponding to those in the data file. In response to a user's clicking on the "Save & Upload" button, mapping is saved. Thereafter, the data in the uploaded file is translated using the data translation map. Each field in the uploaded file is evaluated using the data map and then populated into the correct location into the master data model. FIG. 21 differs from FIG. 20 in that it allows the user to select previously saved mappings and includes a "Save without upload" option that allows the user to store the mapping information without populating the platform data tables. The interface of FIG. 21 also allows the user to add a description of the data translation map to be stored.

A user can select from previously-saved translation mapping, for example by providing an identifier in the field called "Select Mapping." Then, based on the selected translation map, for each of the fields in the master data table, the equivalent field/column on the uploaded field is identified and mapped. On Upload, the mapping is again used to upload the data into master data tables.

According to an embodiment, after the data file is uploaded (1903), the data management system may scan one or more data translation mapping tables to determine if a previously created data translation map exists for the data file. If it is determined that a previously created data translation map exists, the data management system may provide a second user interface that enables user selection of the previously created data translation map for use in populating the platform data tables. Accordingly, in view of the foregoing discussion, the present system and method enables users to source data from multiple data sources and integrate the data into a unified data model regardless of the file structure or data dictionary of the incoming data source.

Figure 22:
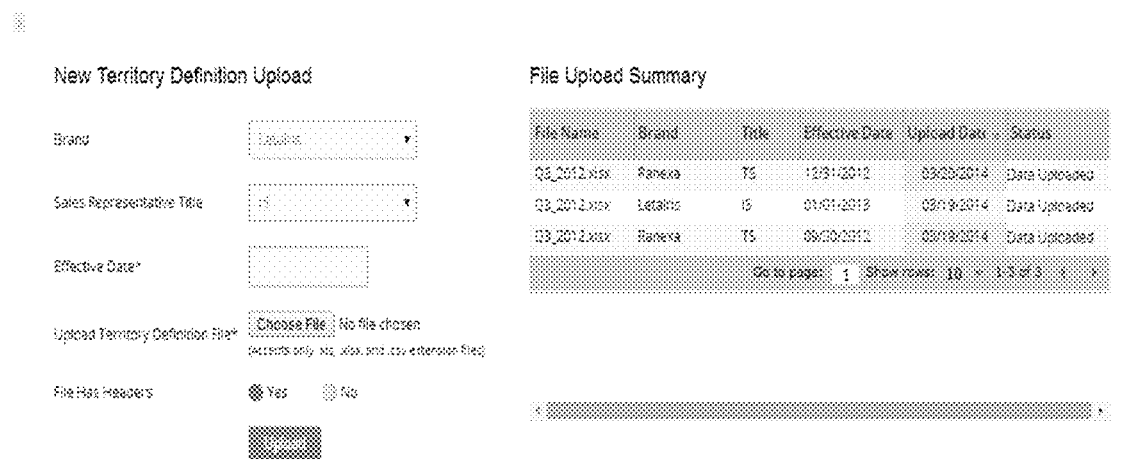

FIGS. 22-25 disclose a map-driven business navigation process based on client-uploaded territories. FIG. 22 depicts an embodiment of a user interface that includes a territory mapping functionality. As shown, a user may upload a Territory Definition File. A territory definition file (e.g., a zipcode-territory mapping file) and tag definitions to a specific brand/sales role is imported. When importing, metadata such as brand, sales role, effective date of the territory definitions, etc. are also captured. Prior to uploading the Territory Definition File, a mapping of data translation map to territory definition fields in the imported file to the territory definitions data model master is developed.

Figure 23:
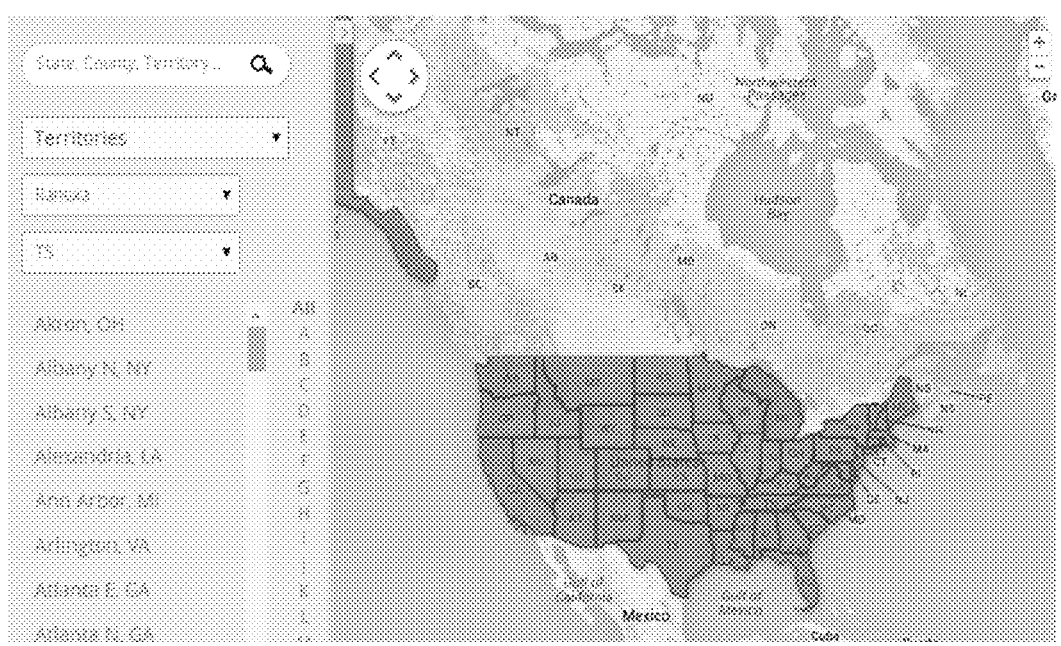
Figure 24:
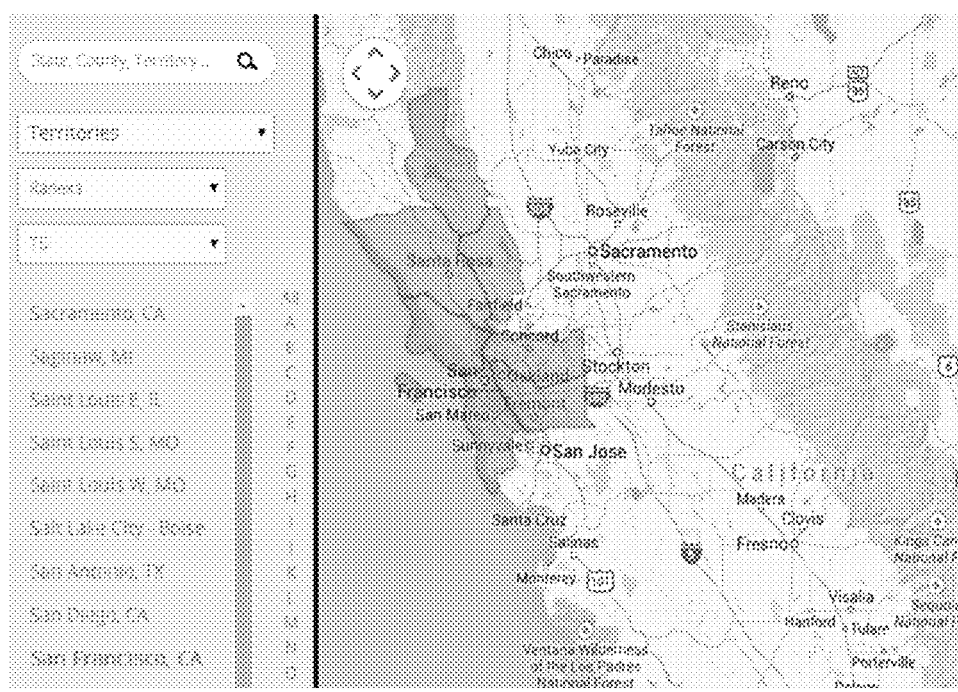
Figure 25:
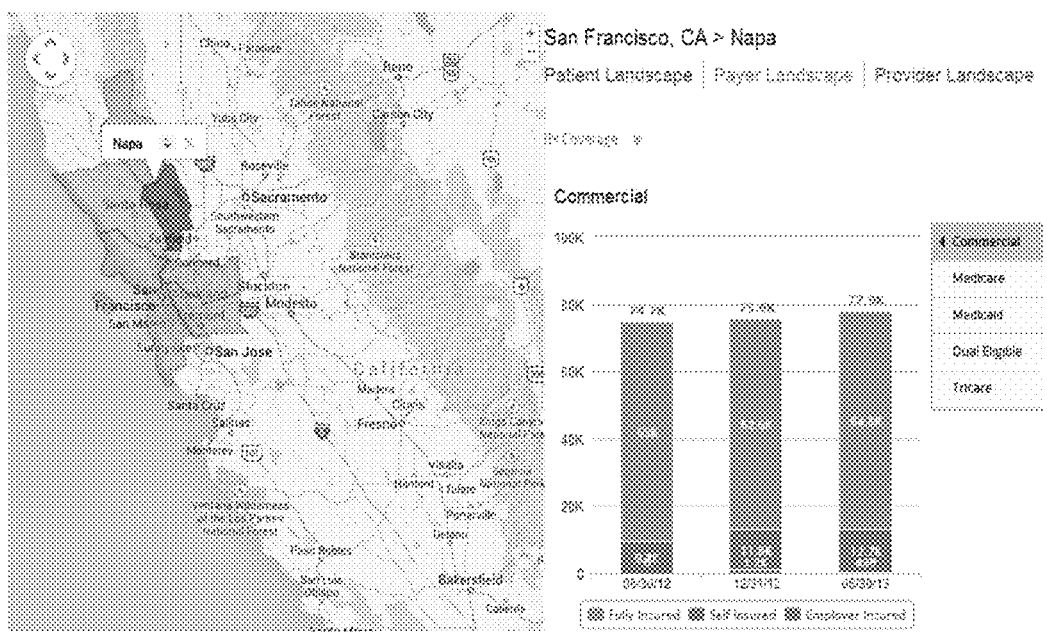

As illustrated in FIG. 23, a list of territories may be displayed based on a user's search criteria. Alternatively, the system may allow a user to directly pick a territory or search for a territory by name, etc. When a territory is picked, the zip codes and counties are identified using the territory definitions file. Then, this retrieved information is used to draw or highlight the territory on the map by calling the corresponding mapping APIs (see FIG. 24). On the map, when a combination of zip codes, geocodes, latitude-longitude, county, etc. are identified for a user-selected region, user-chosen performance metric specific to the chosen segment within the territory may be displayed (FIG. 25).

Various exemplary computing systems may be used to implement embodiments of the systems and methods disclosed herein. The computing systems may include one or more processors and memory. The memory may include a computer-readable storage medium. Common forms of computer-readable storage media include, for example, a floppy disk, a flexible disk, a hard disk, magnetic tape, any other magnetic medium, a CD-ROM disk, digital video disc (DVD), and various forms of volatile memory, non-volatile memory that can be electrically erased and rewritten. Examples of such non-volatile memory include NAND flash and NOR flash and any other optical medium. The memory can also comprise various other memory technologies as they become available in the future. Main memory stores, in part, instructions and data for execution by a processor to cause the computing system to control the operation of the various elements in the systems described herein to provide the functionality of certain embodiments. Main memory may include a number of memories including a main random access memory (RAM) for storage of instructions and data during program execution and a read only memory (ROM) in which fixed instructions are stored. Main memory may store executable code when in operation. The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses. Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or Digital video disc, to input and output data and code to and from the computing system. The system software for implementing various embodiments of the systems and methods disclosed herein may be stored on such a portable medium and input to the computing system via the portable storage device. Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system. Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system. Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, tablets, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or less components.

Figure 26:
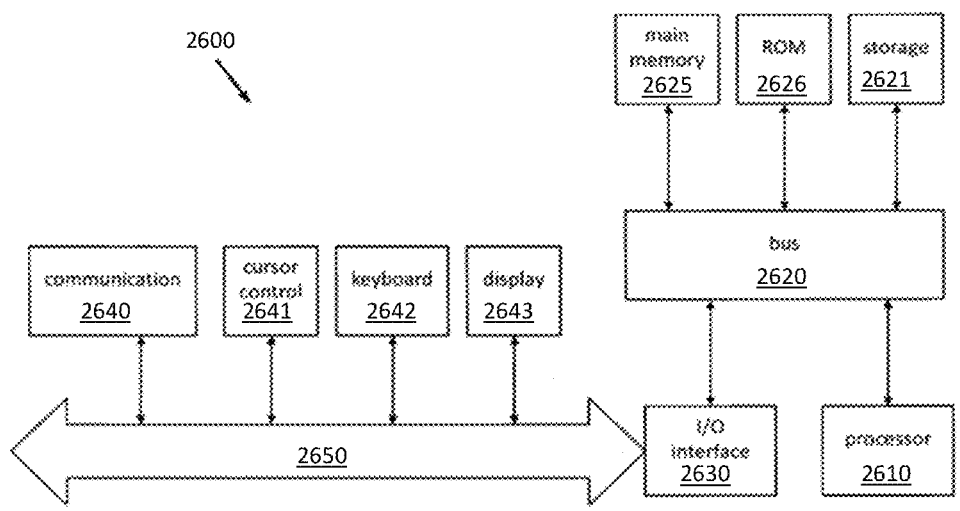
FIG. 26 illustrates an exemplary computer architecture that may be used for the present system and method, for example as the data management system.

FIG. 26 illustrates an exemplary computer architecture that may be used for the present system, for example as the data management system 101. The exemplary computer architecture may be used for implementing one or more components described in the present disclosure including, but not limited to, the user devices and/or message servers. One embodiment of architecture 2600 comprises a system bus 2620 for communicating information, and a processor 2610 coupled to bus 2620 for processing information. Architecture 2600 further comprises a random access memory (RAM) or other dynamic storage device 2625 (referred to herein as main memory), coupled to bus 2620 for storing information and instructions to be executed by processor 2610. Main memory 2625 also may be used for storing temporary variables or other intermediate information during execution of instructions by processor 2610. Architecture 2600 may also include a read only memory (ROM) and/or other static storage device 2626 coupled to bus 2620 for storing static information and instructions used by processor 2610.

A data storage device 2621 such as a magnetic disk or optical disc and its corresponding drive may also be coupled to architecture 2600 for storing information and instructions. Architecture 2600 can also be coupled to a second I/O bus 2650 via an I/O interface 2630. A plurality of I/O devices may be coupled to I/O bus 2650, including a display device 2643, an input device (e.g., an alphanumeric input device 2642, a cursor control device 2641, and/or a touchscreen device).

The communication device 2640 allows for access to other computers (e.g., servers or clients) via a network. The communication device 2640 may comprise one or more modems, network interface cards, wireless network interfaces or other interface devices, such as those used for coupling to Ethernet, token ring, or other types of networks.

Some portions of the detailed description herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulate and transform data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, message servers, or personal computers may be used with programs in accordance with the teachings herein, or it may prove convenient to construct a more specialized apparatus to perform the required method steps. The required structure for a variety of these systems appears in the description above. A variety of programming languages may be used to implement the teachings of the disclosure as described herein.

Moreover, the various features of the representative examples and the dependent claims may be combined in ways that are not specifically and explicitly enumerated in order to provide additional embodiments of the present teachings. The dimensions and the shapes of the components shown in the figures are designed to help understand how the present teachings are practiced and do not limit the dimensions and the shapes shown in the examples.

The present system and method may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed:

1. A non-transitory computer-readable medium having stored thereon computer-executable instructions that, when executed by a computer system, cause the computer system to perform a process comprising:
   receiving a spreadsheet model;
   analyzing the spreadsheet model to determine one or more properties of the spreadsheet model;
   providing a first user interface on the basis of the determined properties, wherein the first user interface enables configuration information to be specified for one or more cells of the spreadsheet model;
   receiving configuration information for the cells; and
   storing the spreadsheet model and the configuration information.

2. The non-transitory computer-readable medium of claim 1 in which the process further comprises:
   selecting the stored spreadsheet model and configuration information on the basis of user input;
   determining one or more fields on the basis of the configuration information;
   obtaining values for the fields;
   providing a second user interface in which the fields are pre-populated with the obtained values; and
   executing the spreadsheet model using the obtained values to generate analysis results.

3. The non-transitory computer-readable medium of claim 1, wherein the spreadsheet model is stored in the same format in which it is received and is associated with a version number.

4. The non-transitory computer-readable medium of claim 1, wherein the spreadsheet includes a plurality of worksheets, and analyzing the spreadsheet model includes determining the number of worksheets in the model and a name of each worksheet.

5. The non-transitory computer-readable medium of claim 1, wherein the first user interface includes one or more input fields, output fields, and assumption fields.

6. The non-transitory computer-readable medium of claim 5, wherein the first user interface enables user specification of a cell in the spreadsheet model for each of the input fields, output fields, and assumption fields.

7. The non-transitory computer-readable medium of claim 5, wherein the first user interface further enables user specification of a data type and a data timeframe for the input fields.

8. The non-transitory computer-readable medium of claim 1, wherein the first user interface enables user specification of graph settings and locations of data for generating a graph.

9. The non-transitory computer-readable medium of claim 1, wherein the first user interface enables user specification of one or more macros to be performed when the spreadsheet model is executed and an order of execution of the macros.

10. The non-transitory computer-readable medium of claim 2, wherein the stored spreadsheet model is selected on the basis of user specified brand information or consumer segment information.

11. The non-transitory computer-readable medium of claim 10, wherein the stored spreadsheet model is further selected on the basis of an associated version number.

12. The non-transitory computer-readable medium of claim 2, wherein obtaining values for the fields includes:
   retrieving values for one or more input fields by querying a platform data table; and
   retrieving values for one or more assumption fields from the spreadsheet model.

13. The non-transitory computer-readable medium of claim 2, wherein obtaining values for the fields includes receiving user input values for the fields.

14. The non-transitory computer-readable medium of claim 2, wherein executing the spreadsheet model includes translating values obtained for the fields into input values for the spreadsheet model.

15. The non-transitory computer-readable medium of claim 14, wherein executing the spreadsheet model includes applying at least one of a macro and a formula of the spreadsheet model to the translated input values.

16. The non-transitory computer-readable medium of claim 2 further comprising:
   receiving notes; and
   saving the notes along with the analysis results.

17. The non-transitory computer-readable medium of claim 16 further comprising sharing the notes and analysis results with specified users.

18. The non-transitory computer-readable medium of claim 17 further comprising enabling the specified users to comment on the shared notes and analysis results.

\* \* \* \* \*